March 27, 1962 R. W. GRISWOLD II 3,027,119
INHERENT SPIRAL STABILITY SYSTEM
Filed June 3, 1955 3 Sheets-Sheet 1
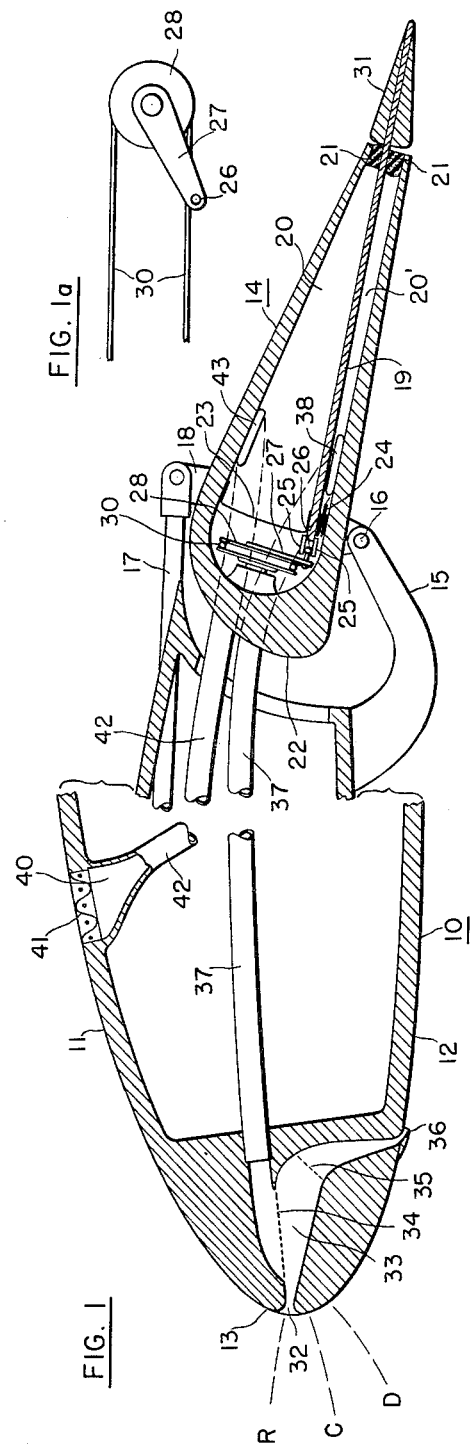
FIG. 1a
FIG. 1
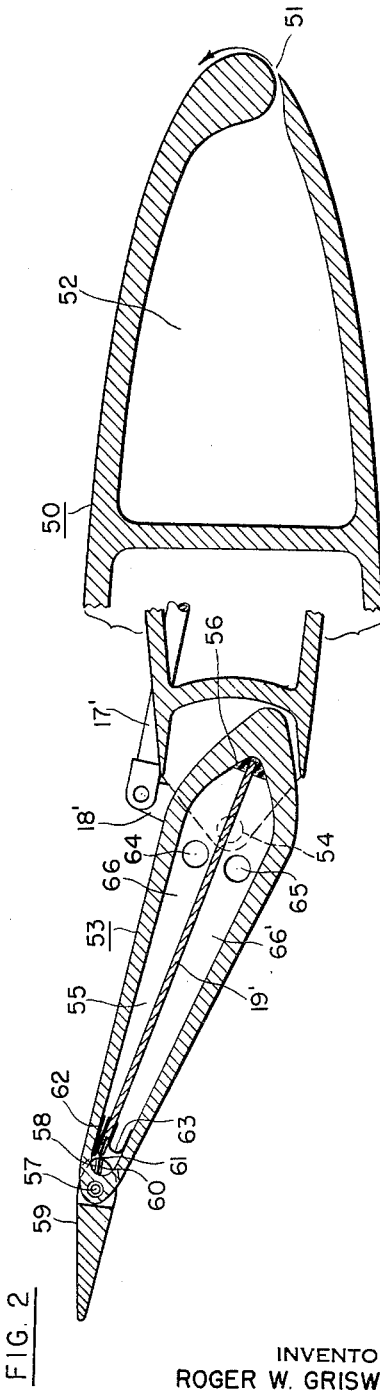
FIG. 2
INVENTOR
ROGER W. GRISWOLD II
BY
*Frank H. Borden*
ATTORNEY March 27, 1962 R. W. GRISWOLD II 3,027,119
INHERENT SPIRAL STABILITY SYSTEM
Filed June 3, 1955 3 Sheets-Sheet 2
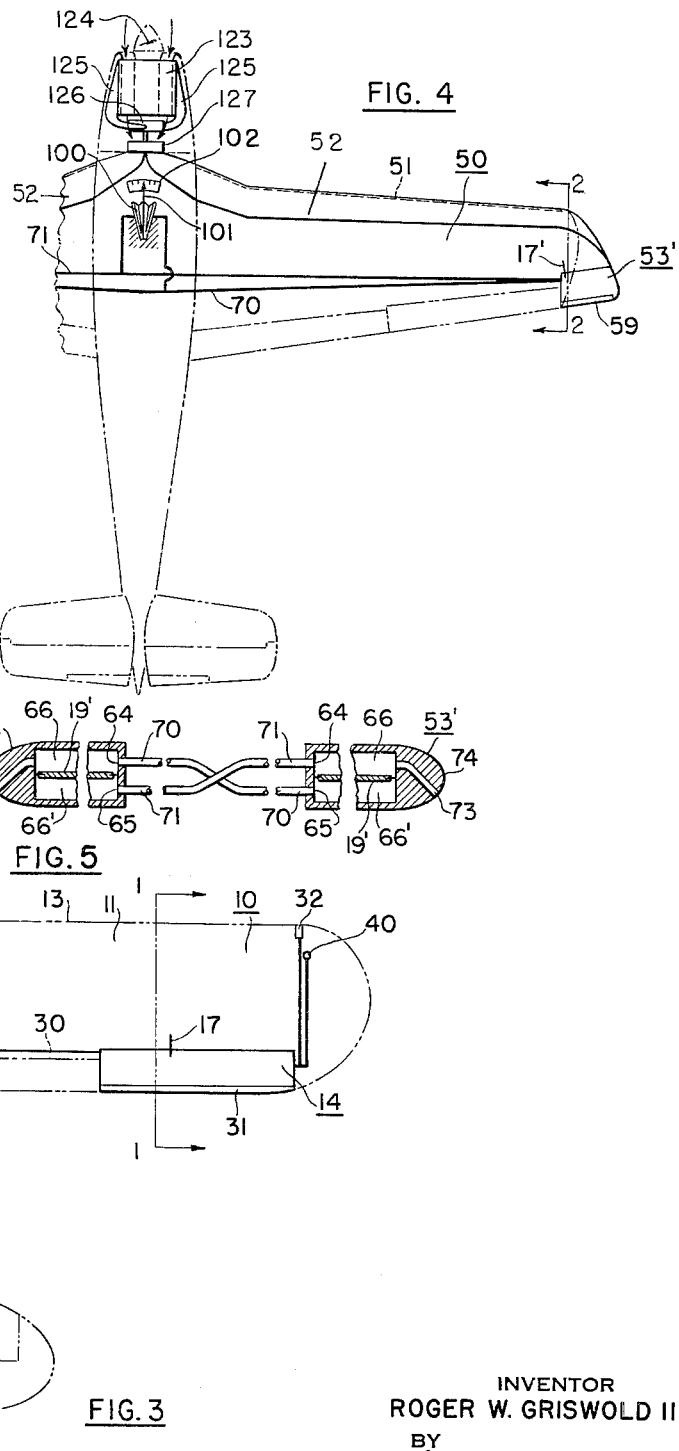
INVENTOR
ROGER W. GRISWOLD II
BY
Frank H. Borden
ATTORNEY March 27, 1962    R. W. GRISWOLD II    3,027,119
INHERENT SPIRAL STABILITY SYSTEM
Filed June 3, 1955    3 Sheets-Sheet 3
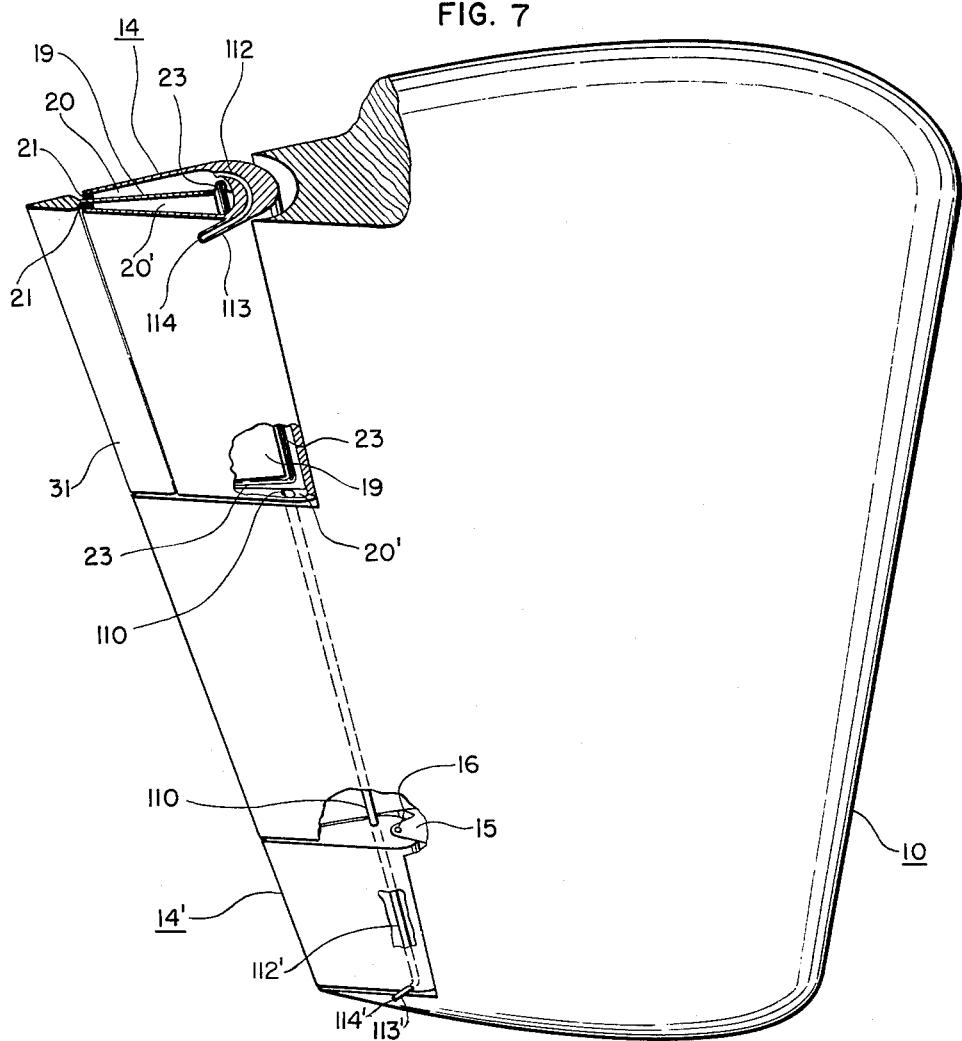
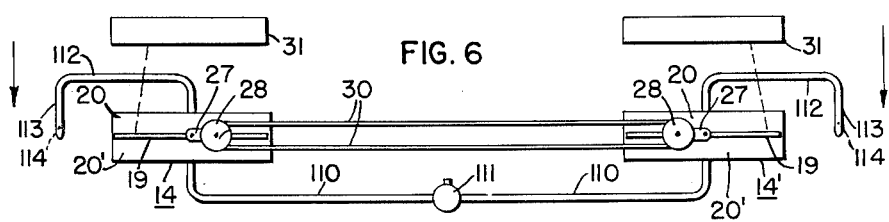
*INVENTOR.*
ROGER W. GRISWOLD II
BY Frank H. Borden
atty

United States Patent Office 3,027,119
Patented Mar. 27, 1962

3,027,119
INHERENT SPIRAL STABILITY SYSTEM
Roger W. Griswold II, Old Lyme, Conn.
Filed June 3, 1955, Ser. No. 513,020
12 Claims. (Cl. 244—76)

This invention relates primarily to flight-induced autocontrol means to vary the stability characteristics of fixed-wing aircraft inherently and without recourse to artificial stability devices, as particularly applied to the lateral control systems of such aircraft so as to correct the customary over-banking or spiral dive proclivity that is generally characteristic thereof, wherein such autocontrol means are aerodynamically responsive to deviations of the aircraft from unbanked straight-line flight.

Generally speaking, modern airplanes with the controls released, will not fly straight but will positively go into a turn. Once a turn is started by even a very slight disturbance, the tendency with such airplanes, is to keep increasing the angle of bank, the rate of turn, the speed, and the rate of descent. The result is a true spiral dive, that is, an ever-tightening turn combined with an ever-steepening dive. If left to its own devices long enough, such an airplane will finally corkscrew down at terrific speed, building up progressively higher g loads as both the speed and the tightness of the turn increase. Airplanes have broken up while still airborne in such graveyard spirals—to use the vernacular—but a far greater number have wound up, momentarily in one piece, in equally fatal terminal crashes. The motion superficially resembles a spin, but differs from a spin in that no stall is involved and that the controls will function normally as soon as the pilot decides to use them. Whether the pilot applies the controls correctly for safe recovery prior to the occurence of structural failure or the terminal crash, depends upon either, visual reference to the horizon, or, his blind flying competence when inadvertently trapped by instrument flight conditions. Without attempting to relate the complexities as to just why an airplane is spirally unstable (or needs to be, as some experts claim) or the matter of human physiological and psychological behavior, suffice it to say that, in such an instrument flight situation, the non-instrument pilot unfortunately responds in the wrong sense to the spiral dive which inevitably develops from the given combination of circumstances. He instinctively applies the controls incorrectly, thus increasing the dive and the probability of terminating the flight with unhappily complete finality.

The fact that an airplane with fixed or "built-in" stability characteristics may have an over-banking-diving tendency in a turn (as is almost universally the case under some conditions of loading and speed) and lacks the stability to recover from such disturbances, whether inadvertently or voluntarily precipitated, means that the pilot must fly the turn by abnormal use of the controls in order to block the turning instability of the airplane. With such typically conventional airplanes, use of right aileron and right rudder to bank with positive yaw into a right-hand turn, for instance, must be followed by some degree of opposite aileron and rudder to avoid over-banking, and finally, by further such inverse control action to unbank the airplane and resume straight flight. On the other hand, if the ailerons particularly opposed the bank associated with coordinated turns (i.e. as by means of variable spiral stability controls) then maintenance of normal actions and forces on the lateral controls would be required throughout the turn, since their inherent tendency to "correct" the disturbance would have to be overpowered. With such type of spirally stable control system, the turn will accordingly be flown naturally, instinctively and with inherent safety irrespective of weather. At any time that the pilot releases the controls in this type of airplane, resumption of normal straight flight will ensue, automatically.

It is among the objects of this invention to provide in aircraft; variable spiral stability characteristics and inherent control means therefor; intrinsic spiral stability control means automatically responsive to flight-induced pressure differentials; inherent spiral stability control means automatically responsive compatibly to resultant differential pressures arising from yawing, rolling and sideslip velocities, so as to generate stabilizing control forces and moments in opposition to deviations in yaw, roll or sideslip; powerful pneumatic amplification means whereby a relatively weak signal pressure differential is tremendously amplified into an adequate servo control operating force; an inherent spiral stability control system of relatively great sensitivity which is self-responsive in opposing minor deviations of the airplane from a straight wings-level flight path; inherent spiral stability aileron controls cooperatively associated in a powered-airfoil wing system with leading edge blowing jet flow control means; a simplified turn indicator coincidental with spiral stability ailerons; inherent spiral stability servo-tab control means for operation of respectively associated primary control surfaces independently of the latter manually operated system but subservient to such manual operation at the option of the pilot; flight-responsive servo-tab control means for inherent spiral stability ailerons with integral tab-aileron actuating bellows and fully-pneumatic means for coordinating operation of complemental wing servo-tab controls; flight-responsive servo-tab control means for inherent spiral stability ailerons with integral actuating bellows and semi-pneumatic-mechanical means for coordinating operation of complemental wing servo-tab controls; an inherent servo-tab control system of minimal friction; an inherent spiral stability aileron control system characterized by a differential pressure sensing element in communication with complemental orifices adjacent the lower surface of the respective wing tips of the aircraft. Other objects and advantages will become apparent as the description proceeds.

In the accompanying drawings, all of which are schematic:

FIGURE 1 represents an airfoil section, as taken for instance on line 1—1 of FIG. 3, to be described, embodying one illustrative form of the invention in which an integral bellows plate and servo-control tab are incorporated in an aileron and comprising an inherent spiral stability control system, especially adapted for mechanical cross connection to a complemental aileron bellows-tab system, in which the respective dual pressure taps are asymmetrically disposed in the fixed section of the airfoil;

FIGURE 1a represents in elevation a detail of an illustrative operating element of the aileron shown in FIG. 1, comprising a crank-arm-pulley-cable unit driven by the bellows plate for mechanically coordinating complemental servo tab operation in the opposite ailerons of the right and left hand wing panels of the airplane;

FIGURE 2 represents a segmental airfoil section, as taken for instance on line 2—2 of FIGURE 4, to be described, embodying another illustrative form of the invention in which a bellows plate is internally disposed within the aileron and directly connected to the servo-control tab thereof, and comprising an inherent spiral stability control system, especially adapted for pneumatic cross connection to a complemental aileron bellows-tab system, in which the respective single pressure tap is disposed in the aileron itself wherein the effects of the centrifugal force developed within the aileron system in a turn are neutralized, and having a leading edge jet;

FIGURE 3 represents a plan view of the right-hand wing panel elements of an airplane incorporating the invention shown in FIG. 1, with the associated airplane partially shown in phantom;

FIGURE 4 represents a plan view of the right-hand wing panel elements of the FIGURE 2 aileron system, plus a coordinated leading edge blowing jet powered-airfoil flow control system, together effecting a conjoint system which permits substantial reduction in aileron area (and particularly the span thereof) and a large increase in flap area and span, and which further illustrates that the pneumatic cross connection tubes extending between the respective ailerons communicate any wing tip pressures to the respective complemental aileron bellows, and are centrally tapped to provide through suitable instrumentation, an extremely simple, effective and accurate type of turn indicator or differential pressure signal indicator;

FIGURE 5 represents a fragmentary elevation view of a typical aileron-bellows system, generally similar to that of FIGURE 4, wherein coordinated complemental action of the bellows-tab systems is attained pneumatically by cross connection with flexible tubes of relatively large diameter and thus low or negligible lag characteristics, and the respective pressure-sensing taps are of the local static pressure type directed laterally outwardly and downwardly in the outboard tip sections of each aileron.

FIGURE 6 depicts diagrammatically, the combination of a single pneumatic tube and mechanical cross connection means between the complemental bellows systems of inherent spiral stability type ailerons constructed according to the principles of the invention, in which the pneumatic cross-over tube cooperates to compound the centrifugal force developed therein in turns with the flight-induced suction pressure differentials developed within the rearward-facing aerodynamic taps, so as to enhance the bellows actuating force;

FIG. 6a depicts diagramatically an asymmetrical version essentially of the FIG. 6 spiral stability system utilizing a single booster control element therefor with negative pressure taps at opposite wing tips and having merely a single interconnecting pneumatic cross-over tube;

FIGURE 7 represents a complete wing and a partial airfoil section thereof constructed according to the principles of the invention and mounting a control element generally similar to FIG. 1, with pressure taps of the type shown in FIGS. 6 and 6a, protuberant from the lower surface of the control element.

In carrying out the invention, recognition is taken of selected pressure differential factors (according to configuration and type of orifice used) which are available in the respective wing tip regions, incident primarily from both the yawing and rolling velocities of the airplane, secondarily and alternatively, from the sideslip differential velocities as well. Further, these wing orifice configurations are specifically chosen respecting their pressural characteristics, to be generally insensitive differentially to angle-of-attack speed changes, by reason of the complemental disposition of these distally spaced apertures in the corresponding identical chordwise planar position relative to the airfoil so as to avoid relative change of incidence between respective orifices with change in pitch attitude of the aircraft.

First, as to the differential pressure effects available from yaw—in a turn of very large radius, the outer wing tip furthest remote from the axis of rotation, increases its relative speed over that of the inboard wing tip by what may at first appear to be an insignificant resultant differential presure factor. For example, if forwardly-facing tubes or stagnation pressure taps (hereinafter referred to as the ram type) in the respective wing tips are spanwisely spaced by thirty feet, then a turn of 6000 feet radius will give a tip velocity differential of ½ of 1% and an increased total head at the outer or faster moving wing tip of approximately 1%. The available pressure differential will obviously vary directly with the spanwise spacing of the pressure taps and inversely with the turning radius, at constant speed. But if these wing tip pressure taps are connected by a tube, the centrifugal force developed upon the contained column of air will substantially off-set the increased ram pressure. Fortunately, the centrifugal force effect can be readily balanced out against itself with dual cross-over tubes, or it can be eliminated by mechanically interconnecting the respective bellows-tab systems, to be described, or centrifugal force can be used cooperatively with generally parallel-to-the-local flow flush orifices (hereinafter referred to as the local static pressure type) or rearwardly-facing pressure taps are preferably used (hereinafter referred to as the negative pressure or suction type) wherein the reduction of pressure for the faster moving wing tip, works with the effect of centrifugal force to compound the available pressure difference. Applying the intermediate case of utilizing the ram type of pressure tap with zero centrifugal force effects, to the above example at a speed of say, 150 m.p.h., thus giving a difference in tip velocities of about one foot per second, means that the specific (or unit) pressure available for control purposes is only 0.004 p.s.i. By means of the extremely powerful bellows amplification system of this invention, however, such an apparently inconsequential specific pressure can be readily stepped-up to a resultant servo-tab operating force of between 2–3 pounds in each aileron of a typical light-plane installation, for instance. Depending upon the bellows chord/span ratio, a force of that magnitude can provide a tab actuating hinge moment of from 10–25 inch-pounds which should be sufficient for the most sensitive-response design requirements of the stated category of airplane, in view of the low friction characteristics of the servo control system.

The fundamental contributions of the invention respecting response of the device to the yawing velocity effects, accordingly are: (1) that it permits practical utilization of extremely small specific pressure differentials, and; (2) ailerons or rudders can consequently be servo-controlled by aerodynamically-responsive inherent or natural control means without recourse to extrinsic or artificial stability systems, so as to oppose even very gentle turns automatically.

Secondly, concerning the roll effects—another important pressure differential factor which is likewise fundamental to the invention independently and in cooperation with the yaw effects, may be illustrated by consideration of the extremely sensitive pressure response to angle-of-attack asymmetry between wing tips due to the rolling velocities for example, with ram type pressure taps, the precise location of the front stagnation pressure point, as determined by impingement of the entering dividing streamline generally upon the nose of the airfoil, as in FIG. 1. Consequently, when a wing rolls, substantial resultant differential pressures can be generated at particular pre-selected leading edge points on opposite wing tips, irrespective of yaw—depending upon the rate of roll, which thus determines the change in respective wing tip angles-of-attack and the corresponding relative displacement of the stagnation points, and in turn, the magnitude of the local presure changes. The latter can easily be comparable with the high tip pressure differentials which can be developed in a very tight turn by the yawing velocities, alone. Thus, one can likewise select a nose ram pressure tap location that will also be substantially sensitive to the rolling velocity effects. The preferred location for the impact or ram type of pressure tap is adjacent to and slightly above the stagnation point on the wing at cruising lift coefficient—as indicated in FIGURE 1 by dashed line "C" which designates the entering dividing streamline and impingement thereof upon the surface at cruising speed with consequent conversion of velocity energy to impact pressure as the local flow is arrested at that point. This stagnation streamline moves upwardly on the rising wing, as indicated by dashed line "R," with consequent development of increasing and perhaps full total head pressure at the selected pressure tap. The matching streamline on the dropping wing is displaced downwardly, as indicated by dashed line "D," with resultant acceleration of the upper surface local flow over the mouth of the pressure tap and corresponding reduction of the static pressure therein.

The foregoing pressure changes due to roll are obviously reversed with the suction and static type pressure taps of FIGURES 6 and 5, respectively, to be described, which are faced relative to the local flow, downwardly and rearwardly, in FIGS. 6 and 7, and, downwardly outward in FIG. 5. The only change required in such cases from the ram type hook-up, is that the pressure-sensing tubes be connected to the opposite bellows chambers.

The fundamental further contributions of the invention respecting response of the device to the rolling velocity effects, accordingly are: (1) that, with the ram type pressure tap located above the high speed local stagnation point, as illustrated by FIG. 1, the flight-induced pressures at that point will increase on a rising wing and decrease on a dropping wing, and vice-versa with the local static or negative pressure taps which face generally away from the local flow on the rising wing and into such flow on the dropping wing, as by means of taps flush with the lower surface, for example; (2) the change in the pressure differential across the bellows plate, due to the rolling velocities, is thus consistent or compatible and acts in the same sense with that due to the yawing velocities, the system accordingly providing the correct stabilizing control response to such dual-axis deviations from an unbanked straight flight path, and, (3) the requisite flow symmetry in the chordwise plane of the wing tip complemental pressure tap system for sensing the rolling velocities, still leaves the system insensitive to variations in aircraft speed since such changes in pitch angle-of-attack, while maintaining a wings-level attitude, will not laterally untrim the aircraft, in view of the complemental and respectively equalized wing tip ambient pressures.

At the relatively low air speeds of many light planes, it will generaly be desirable to provide a bellows plate of as large an area as may be practicable to use in specific instances, in order that the system may be productive of an acceptable level of sensitivity to even minor spiral mode disturbances of the airplane, as is indicated by the foregoing cited light plane example. In applying the device integrally to ailerons, for instance, all the space that can be made available for the bellows plate within each aileron, may require such a bellows-tab system in both ailerons, or only in one aileron. On the other hand, in some high speed airplanes, it may be satisfactory to reduce the bellows-tab spanwise extent to only a fraction of the span of either both or just one aileron. Alternatively, of course, the device can be disposed within the wing or any other suitable space.

Referring to FIG. 1, a chordwise section through a wing and an aileron of the instant invention is disclosed. The wing section 10 has an upper surface 11, a lower surface 12, merging into a leading edge surface 13. The aileron 14, of the invention is pivotally mounted on a horn 15, at pivot 16, and its deflection is manually controlled by the push-pull rod 17 pivoted to a horn 18 on the aileron. The aileron 14 has at least a spanwise section containing upper bellows chamber 20 and lower bellows chamber 20', movable bellows plate 19, and closed toward the trailing edge by layers of sponge-rubber or the like 21—21, which latter also serve as the spanwisely extending bellows plate-tab pivot. The bellows plate extends chordwisely of the aileron from its spanwise pivot to termination close to the leading edge 22. It is the chordwise extent that is important in developing the amplifying leverage of the system i.e. the tab actuating hinge moment, while the spanwise and chordwise defined area develops the force. Therefor an aileron of relatively short span and wide chord is preferable so far as the bellows organization is concerned.

The bellows chambers and bellows plate are sealed by suitable means such as by the peripherally-continuous flexible impervious sheets 23 and 24 for containment of the bellows air under positive or negative pressure relative to that of the ambient flow, as the case may be. For clarity these sheets 23—24 are only shown adjacent the free end of the bellows plate.

The chordwisely free end of the bellows plate 19, mounts a pair of parallel spaced slot-defining plates 25—25 spaced to receive a roller or like low friction pin element 26 on the crank arm 27 on a pulley or the like 28 journalled internally of and on the leading edge section 22 of the aileron. The pulley 28, as shown in FIG. 1a, mounts a cable or like flexible endless connector 30, attached to the pulley, extending transversely through the wing 10 to a similar pulley and related organization in the aileron on the far wing tip of the opposite wing section. The bellows plate 19 in rear of the sponge rubber or like sealing pivoting element 21—21 mounts a servo tab 31. The position of the latter relative to the aileron 14 is directly controlled by the position of the bellows plate 19 in the bellows chambers 20—20' and is operable independently of aileron operation.

In order to actuate the bellows plate 19 and thus control the disposition of the servo-tab 31 for developing aileron-moving force, the leading edge 13 of the wing 10 has a duct opening 32, comprising a ram type pressure tap leading into a plenum chamber 33, suitably screened as at 34 and 35, and providing a lower surface water drainage outlet 36 which is minute relative to the ram pressure tap 32. The plenum chamber 33 communicates through a flexible conduit 37 to an outlet 38 in the lower bellows chamber 20', beneath the bellows plate 19. The upper surface 11 of the wing section spaced from the leading edge 13 in a region of reduced or relative negative pressure has an inlet 40, secreened by any desired foraminous material 41, in the nature of a porous sheet of the latter, leading through a flexible conduit 42 to an outlet 43 in the upper bellows chamber 20, above the bellows plate 19.

This FIGURE 1 Pitot-Static type combination of the ram type and the static type dual pressure-sensing unit as illustratively applied to an airplane in FIGURE 3 enhances the available pressure differential across its adjacent bellows system in the same wing tip organization. This feature compensates, and perphaps more so, for the static friction involved in the mechanical cross connection that is accordingly required, in this case, to the complemental bellows system in the opposite wing aileron.

The disposition of the ram pressure tap 32 is such that the front dividing streamline between the flow passing over the upper surface and that flowing over the lower surface impinges on the airfoil at a stagnation point determined by the local flow angle-of-attack of the wing section at that point. Thus the front dividing or stagnation streamline indicated by the line C typifies the condition for the normal steady state flight cruising speed. Line D denotes the downward shift thereof when the instant wing drops, resulting in increased local velocity over the tap 32, with corresponding reduction of the internal pressure in the plenum chamber 33. Line R designates the stagnation stream line as shifted on a rising wing resulting in decreased local velocities and thus development of greater stagnation pressures in the plenum chamber 33.

With relative effective local changes in the angle-of-attack incident to rolling velocities, regardless of cause, the pressures effective on the upper and lower surfaces of the bellows plate change and the resulting differential pressure moves the bellows plate and thus the servo control tab. The change of angle of the servo tab develops a force effective on the aileron, again through an amplifying hinge moment couple, to deflect the aileron. If the pilot is flying "hands-off" at the moment, the aileron moves in response to the servo tab deflection and incidentally in turn, moves the pilot's control stick or wheel. At the same time, in the illustrative embodiment, through the flexible cable connection 30, anchored for forced motion with and responsive to any angular change of the position of the pulley 28, the bellows plate of the complemental unit or element on the opposite wing is positioned to effect the same angular deflection of its servo tab in the opposite direction relative to its aileron. With such mechanical cross-connection between ailerons they will respectively assume their customary upward and downward deflections. The friction of the system incorporating the bellows plate 19, servo tab 31, is both independent of and inconsequential relative to the friction in the aileron control system. This organization of aileron including bellows gives a lever of substantial mechanical advantage in moving the servo tab, which becomes greater as the chord ratio of the bellows plate relative to the tab is increased.

As has been set forth in detail in applications Ser. No. 426,665, filed April 30, 1954, now issued as Patent 2,927,748, of March 8, 1960, and Ser. No. 433,322, filed June 1, 1954, now issued as Patent 2,885,160 of May 5, 1959, applicant has invented a leading edge blowing jet flow control system. This is indicated in FIGURE 2 as well as in FIGURE 4 hereof. The combination shown in these figures utilizes the advantages of this jet flow control system cooperatively with the instant invention, to permit appreciable reduction in aileron area, and particularly span and a generally much larger increase in flap area and span, as illustratively indicated by the plan view of the airplane shown in FIGURE 4. In this form of invention shown in airfoil section by FIGURE 2, the basic airfoil section 50 has a leading edge blowing jet 51, supplied by blowing pressurized flow in the spanwise duct 52 of the airfoil. In this case the aileron 53, pivoted on the axis of pin 54, is pilot-controlled by the push-pull rod 17' pivoted to the horn 18'. The aileron is closed to form a bellows cavity 55, in the forward portion of which a hinge pad, as of sponge rubber, 56, is secured. A bellows plate 19' is embedded at its forward end in the hinge pad 56, for limited motion on the latter as a spanwise pivot. The bellows plate is of appreciable chordwise extent for enhanced leverage. The aileron at its trailing edge merges into the surfaces of a servo tab 59, pivoted to the aileron at 57, and the leading edge 58 of the servo tab 59 extends forwardly of the pivot into the rear end of the bellows cavity 55. The tab leading edge is slotted as at 60. The rear end of the bellows plate closely adjacent to the tab leading edge mounts a preferably flexible strip 61 such as leather extending into the slot 60, in which latter it is slidable with bellows plate movement. Flexible diaphragmatic sheets, respectively upper sheet 62, and lower sheet 63 are sealed to the bellows plate and to the inner surfaces of the aileron to define with the bellows plate and hinge pad 56 upper and lower sealed bellows chambers. The upper chamber 66 has a pressure port 64, and the lower chamber 66' has a pressure port 65.

While the conduit communications with the pressure ports 64 and 65 will be discussed hereinafter, it will be understood that the aerodynamic loads on the servo tab 59 are substantially balanced-out by the leading edge 58 relative to the tab hinge 57, and are such that the proposed leather connection with the bellows plate will merely have to overcome essentially just the static friction of tab hinge 57, in initiating movement of servo tab 59. The slidable action of the flexible strip 61 in slot 60, is barely detectable until the tab is fully deflected. While such a leather connection is simple and inexpensive, any suitable and more positive type of interconnection can be used, if desired.

As shown in FIGURES 4 and 5 a conduit 70 extends from the pressure port 64 of FIGURE 2, in the upper bellows chamber 66, to connection with the pressure port 65 in the lower bellows chamber 66' of the complemental aileron 53' on the opposite wing tip. A conduit extends from the pressure port 65 of the lower bellows chamber 66' to connection with the pressure port 64 in the upper bellows chamber 66 of the aileron 53'.

In order to render the system operable in response to the desired flight-induced pressural effects, relating particularly to the spiral mode of the aircraft, it is necessary with any type of inherent stability and control device of this invention, to supply the requisite complemental pressures, whether from ram pressure, ambient static pressure, or negative pressure sources, which become functionally differential incident to the rolling and yawing velocities, so that an operative signal and control pressure differential will be transmitted to the bellows plate. The complemental pressure taps are so disposed as to have the maximum effective spanwise spacing at selected locations generally in the respective wing tip regions, and may be comprised of either plural taps in each wing tip (as in the FIGURES 1 and 3 combinations) or just one orifice in each wing tip (as shown in FIGURES 5, 6, 6a, and 7), according to particular combinations of the pressure tap configuration and the type of cross connection system communicating with the respective bellows units. In the illustrative case as shown in FIGURE 5, a "flush" static type pressure tap 73 extends laterally and downwardly from the upper bellows chamber 66 of each aileron 53 and 53' to the outboard side edge surface 74 of the aileron. If the pressure tap 73 is so located as to be responsive primarily to ram impact pressure and is therefor of the ram type, then the connection would be into the lower bellows chamber 66'. The purpose of the cross connection tubes 70 and 71, is to insure that as regards the respective ailerons, the effective pressures on, and the reactions of the respective bellows plates, and therefor the movement of the servo tabs, are reciprocals, independently of the pilot's aileron controls, and that the bellows plate forces are neutralized in wings-level straight flight. The pilot can always override manually with a mere modicum of incremental force the inherent or automatic aileron control system, but if flying hands-off, the manually controlled aileron system is free to adjust to the instantaneous correcting influence of the pneumatically coupled system which communicates the available wing tip pressure differentials to both complemental ailerons. This enhances the sensitivity of the system, also quickens the response thereof, since it develops twice the corrective force available from a single uncoupled aileron, to be described. While the fully pneumatic system requires two cross connecting tubes, it has the important benefit over the mechanical linkage of substantially frictionless pressure differential transmission.

Referring to FIGURE 4, mention has been made of the turn indicator or differential pressure signal detector. In essence this comprises a double bellows instrument 100, having a pointer 101 movable over a scale 102. The cross connecting tubes 70 and 71 are respectively coupled into opposite sides of the instrument, and by the instant differential pressures in the respective bellows, position the pointer as a direct function of the instantaneous rolling velocities and bank angles and therefor rate of turn of a given steady-state bank angle. In this case it would be desirable to introduce friction or an equivalent spring constant, opposing the displacement of pointer 101, so that its resulting position will be proportional to the pressure differential within instrument 100.

In the configuration shown in FIGURE 6, a suction type negative pressure signal orifice aileron organization is shown, in which, although the same bellows organization and mechanical cross connection is used, as shown in FIGURES 1 and 1a, and bearing the same reference characters, a single conduit connection extends between the lower bellows chambers of both ailerons. Thus aileron 14 on the left, and aileron 14' on the right each have the same bellows plate 19 and interconnected servo tab 31, and the same upper and lower bellows chambers 20 and 20' respectively, the same crank arms 27 and common anchored cable 30, they have additionally a connecting single conduit 110—110 communicating at its extreme ends with both lower chambers 20', and, somewhere in its length preferably generally centrally thereof, communicating with an altitude-relief static pressure tap 111.

Each aileron has its upper bellows chamber 20, in communication with an aft-biased pressure tap responsive to negative pressure relative to the free stream static pressure. This may comprise a conduit 112 communicating with said chamber 20 and having a terminal input end 113. The latter comprises a rearwardly protuberant tube having an entrance aperture 114 formed on a downwardly and rearwardly facing diagonal so as to be responsive to the negative pressures operatively induced by the local flow thereover.

It will be seen that by this system no ram pressures are involved, the low pressure in conduits 112—112 being communicated to the upper bellows chambers 20—20. The centrifugal force effects in conduits 110—110 act to increase or decrease the relative pressures in lower chambers 20' and 20', as the case may be, according to the direction of turn. It will be seen that the centrifugal force effects cooperate with the flight-induced suction pressure effects, incident to the rolling and the yawing velocities, to compound the available pressure differentials acting on bellows plate 19—19.

In the configuration shown in FIGURE 7, wing 10 has the customary aileron control elements 14 and 14' but just one such element, aileron 14 in this case, is equipped with movable bellows plate 19 forming, together with peripherally-continuous flexible and impervious sheets 23—23, upper bellows chamber 20 and lower bellows chamber 20'. Plate 19 and its structurally integral servo tab 31, are pivotally mounted on sponge rubber or the like resilient pivots 21—21 which coincidentally also comprise the final closure seals for chambers 20 and 20'. This servo tab operable control element corresponds generally to the similar element of FIG. 1. Lower bellows chamber 20' communicates with flexible pneumatic conduit 110 which is carried spanwise through wing 10 and substantially through aileron 14' where it is identified as conduit 112, and near the outboard end of aileron 14' it protrudes through the lower surface thereof as terminal end 113 having downwardly and rearwardly facing aperture 114. Upper chamber 20 of aileron 14 similarly communicates with conduit 112, terminal end 113 and aperture 114 which are disposed externally in geometrically similar relations to the corresponding components on opposite aileron 14'. The aerodynamic structures of the invention disclosed by FIG. 7, are functionally identical with those of FIG. 6a, to be described.

Mention has been made of the blowing jet flow control system, in connection with the discussion of FIGURE 2. This will be amplified in a further discussion of FIGURE 4. Referring to FIGURE 4, a continuously operating exhaust driven turbo-blower unit is disposed in the airplane to supply the duct 52 with pressurized flow (coincidentally comprising the engine cooling airflow) for the blowing jet 51. This system comprises a primary power plant 123, propeller 124, exhaust conduits 125—125 communicating with an exhaust driven turbine 126, in turn driving a blower 127, of any desired type. The blower inducts the engine cooling air through the primary power plant, and may also be supplied with part or all of the exhaust gases discharged from the turbine, if desired. In any case it will be observed that the output of the blower into the ducts 52 is substantially proportional to the primary power output, and the supply to the ducts is of heated gas, furnishing constant anti-icing for the leading edge sections of the wings.

It is pointed out that a single automatic aileron system of this invention operative on one wing only, can be availed of to effect spiral stability control of the airplane on which it is installed. In this case, the available corrective forces applied to the aileron system, are halved relative to those which are available with the dual or coupled bellows type ailerons so far described. A single such spiral stability aileron system would also, of course, utilize the opposite wing tip pressure taps and could compound the flight-induced aerodynamic and centrifugal force effects, in a system comprising a simplified asymmetrical version of FIGURE 6, wherein one aileron-bellows unit, the mechanical cross connection assembly, and the altitude-relief tap, would all be eliminated, and the conduit 112 directly connected to the pneumatic cross-over tube 110 on the side of the eliminated aileron organization, as shown in FIGS. 6a and 7. It further logically follows that two of these asymmetrical single aileron systems, can be used complementally on opposite wing tips in the same airplane, each functioning on the specified separate entity basis, at least so far as the respective servo control systems are concerned. Such a double-pneumatic separate-entity system will obviously maximize the centrifugal force effects which can be made available for automatic stabilizing control response.

The foregoing specifications and related drawings are merely illustrative of the basic principles of the invention, but by no means all-inclusive as to the numerous possible design modifications which can be worked out by those skilled in the art, on the basis of this disclosure. As a further example thereof, in FIGURE 1, upper bellows chamber 20 could be directly vented to the local static pressure, such as through aileron nose section 22 or through the upper sponge rubber pivot 21, instead of to the static pressure tap 40 in the fixed upper surface 11 of airfoil 10. Additionally, in certain installations only one flexible diaphragmatic sealing element may be required.

I claim as my invention:

1. An automatic wings-leveling device for fixed-wing aircraft comprising pneumatic amplifier detector means operatively responsive to differential pressures induced compatibly in banked-flight attitudes of said aircraft both by the rolling velocities and by the yawing velocities thereof, said pneumatic detector means including complemental suction type orifice means respectively juxtaposed externally protuberant from the lower surface of said wing and distally in the tip regions thereof such as to achieve favorable wing-orifice interference effects and to thereby aerodynamically induce local-flow-augmented substantial negative pressures therein relative to the undisturbed ambient static pressure, said negative pressure being effectively equalized between the respective orifices in normal wings-level flight and providing operative differentials therebetween cooperatively either due to said rolling velocities in the absence of an effective yaw deviation from the course of said aircraft or due to said yawing velocities when the rate of roll is either non-existent or ineffective or due to any effective combination rates of roll/yaw banked flight deviations, pneumatic interconnections between said respective means to effect response of said amplifier detector means generally proportional to said rates, and means for applying said response to the appropriate controls of said aircraft for rectifying said deviations.

2. An automatic stability augmentation system for aircraft having a fixed-wing comprising pneumatic banked-flight amplifier detector means operatively responsive compatibly to differential pressures induced therein by deviations from the normal wings-level attitudes of said aircraft both by the rolling velocities and by the yawing velocities thereof, said amplifier detector means including a complemental negative pressure type orifice means distally disposed proximate to said wing and generally within the ambient relatively positive pressure flow field thereover, pneumatic interconnections between said means to effect response of said amplifier detector means generally proportional to said pressures, and actuator means for applying said response to the appropriate controls of said aircraft for rectifying said deviations, whereby said system stabilizes the spiral mode of said aircraft effectively augments its lateral stability and enhances the natural roll damping of its said wing.

3. An automatic stability augmentation system for aircraft having a fixed wing and a lower surface thereof, comprising banked-flight amplifier detector means responsive compatibly to differential pressures resulting from the rolling velocity and from the yawing velocity deviations from the normal wings-level attitude of said aircraft including both concurrent and effectively separate roll and yaw deviations, said amplifier detector means including a complemental orifice means having apertures in said lower surface inclined away from the local flow thereover so as to avoid ram impact therein and respectively juxtaposed distally in said aircraft in proximal relation to said surface to operatively provide favorable wing-orifice pressural interference effects, pneumatic interconnections between said means to effect response of said amplifier detector means generally proportional to differences in said pressures, actuator means connecting said amplifier detector means and the appropriate controls of said aircraft for applying said response to effect recovery from said deviations, whereby said pressures are effectively equalized in said normal attitude and said differences are of similar order or sign for like said roll and yaw deviations and of opposing order for opposite roll and yaw maneuvers.

4. An automatic stability augmentation system as recited in claim 3, wherein said orifice means are externally protuberant from said surface so as to augment said interference effects and provide flight-induced substantial negative pressures in said apertures relative to the ambient atmosphere static pressure.

5. An automatic stability augmentation system as recited in claim 3, wherein said orifice means have aft-biased apertures.

6. An automatic wings-leveling device for fixed-wing air-craft having lateral control means therefor, including rate-of-roll and rate-of-turn pneumatic signal means comprising suction type orifice means respectively juxtaposed proximate to the lower surface of said wing and distally in the tip regions thereof such as to achieve favorable wing-orifice local flow interference effects and to aerodynamically induce substantially negative pressures therein relative to the ambient or freestream static pressure, said respective negative pressures being effectively equalized in normal wings-level flight and providing operative differential signals therebetween cooperatively resultant from banked flight attitudes of said aircraft both by the rolling velocities and by the yawing velocities thereof, and amplifier means including a power source therefor communicated with the respective orifice means sensing said signals and productive of a control moment proportional thereto, and servo means connected to said amplifier means and to said control means to actuate the latter automatically in response to said control moment.

7. An automatic wings-leveling device for fixed-wing aircraft as recited in claim 6, wherein said signals from the rolling velocities oppose any roll of the aircraft and said signals from the yawing velocities oppose turning flight.

8. An automatic wings-leveling device for fixed-wing aircraft having lateral control means, complemental wings having spanwisely spaced lower surface wing tip regions thereof, complemental orifice means disposed in said regions and respectively responsive to the aerodynamic pressural changes induced primarily by the rolling and yawing velocities of the aircraft, amplifier means productive of a control moment, power means connected to said amplifier means, means effectively connecting said respective orifice means and said amplifier means, servo means connected to said amplifier means and to said lateral control means.

9. In fixed-wing aircraft having complemental wings mounting ailerons with lower surfaces thereof, complemental effectively connected pressure sensors disposed essentially integral with said lower surfaces and respectively distal in the wing tip regions thereof in spanwise spacing such that deviations of said aircraft from a wings-level attitude result in pressure differentials or signals between said sensors as induced both by the respective wing tip angle-of-attack changes incident to the rolling velocities of said aircraft and by the respective wing tip velocity changes incident to the yawing velocities of said aircraft, whereby said pressure differential signals due to said rolling velocities are proportional to said aircraft's rate-of-roll and those due to said yawing velocities are similarly proportional to its rate-of-turn and wherein said signals are of like order or sign rolling into a turn but opposite in sign during the roll-out maneuver of said aircraft.

10. In aircraft having a wing and a lower surface and spanwisely spaced wing tip regions thereof, flight-responsive and effectively communicating detector means juxtaposed in complemental pairs proximate to said surface in said respective regions and productive of both rate-of-roll and rate-of-turn flight-induced signals between said means resulting from maneuvers other than essentially straight flight of said aircraft, whereby said respective signals are compatible in the sense of comprising a potential source for opposing rolling and yawing maneuvers of said aircraft.

11. An inherent stability augmentation system for aircraft having a wing and controls therefor and functionally-integral complemental negative pressure type orifice means distally disposed in spanwise spacing relative to said wing and generally within the ambient relatively-positive pressure flow field thereover and differentially responsive to pressural changes occurring therein, amplifier means, servo means associated with at least one of said controls, and interconnections between said means, whereby said system is effective to augment both the lateral and the spiral stability modes of said aircraft.

12. An automatic stability augmentation system for aircraft having a wing, controls therefor and lower surface tip regions thereof, comprising aerodynamically-responsive signal means symmetrically disposed complementally in said regions and having apertures inclined away from the local flow thereover and productive of negative pressures in said means, means communicating with said controls and effective to amplify said pressures into a workable force respecting movement of said controls, and interconnections between said means, whereby said pressures are effectively equalized in the normal wings-level straight-flight attitudes of said aircraft and differentially effective upon said controls in banked-flight attitudes of said aircraft and further provide signals of similar order or sign for like rolling and yawing deviations and opposing order for opposite such maneuvers of said aircraft.

References Cited in the file of this patent

UNITED STATES PATENTS

| | | |
|---|---|---|
| 2,343,288 | Fink | Mar. 7, 1944 |
| 2,368,059 | White | Jan. 23, 1945 |
| 2,400,701 | Meredith | May 21, 1946 |
| 2,420,932 | Cornelius | May 20, 1947 |
| 2,556,353 | White | June 12, 1951 |